W. BEAL, Jr.
Grain Mill.
No. 5,916.
Patented Nov. 14, 1848.
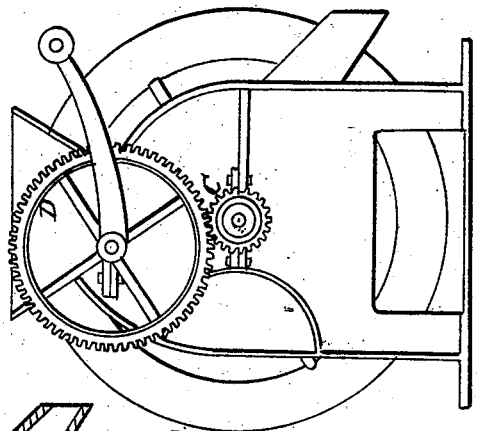
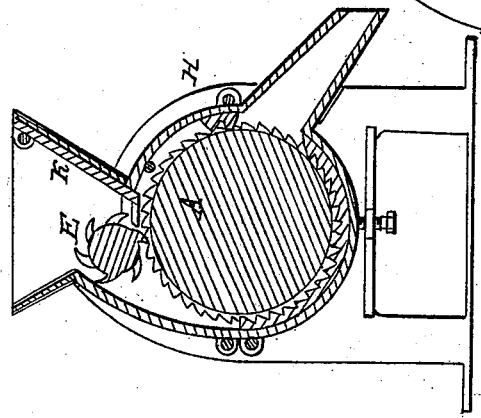
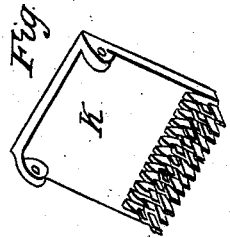
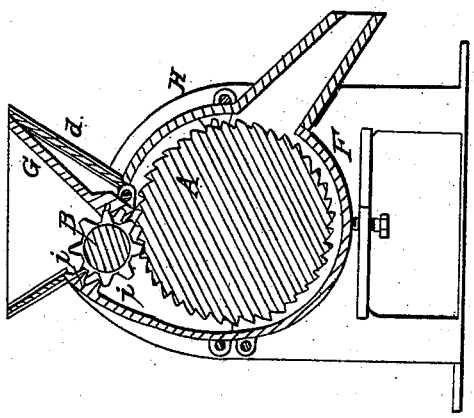
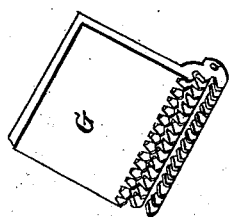

UNITED STATES PATENT OFFICE.

WM. BEAL, JR., OF LOWELL, MASSACHUSETTS.

MILL FOR BREAKING AND GRINDING.

Specification of Letters Patent No. 5,916, dated November 14, 1848.

*To all whom it may concern:*

Be it known that I, WILLIAM BEAL, Jr., of Lowell, in the county of Middlesex and State of Massachusetts, have invented and added a certain Improvement in Machines for Cracking, Crushing, and Grinding Cobs, Corn, and other Substances, patented by myself and B. S. Hale, December 17, 1846; and I do hereby declare the following to be a full, clear, and exact description thereof, reference being had to the accompanying drawings, making a part of this specification.

Figure 1, is a vertical section of the machine patented by Beal and Hale—above referred to—with my improvement added thereto; to wit: the plate G, made fast in the hopper and having a toothed concavity at its lower end,—the teeth of which pass between and operate with the teeth radiating from the small cylinder B. In the Beal and Hale machine—above referred to—the substances placed in the hopper are first operated upon and broken by the teeth of the large cylinder A, having a very rapid motion, passing between the teeth of the small cylinder B,—revolving in the same direction at a very slow rate of motion.

Fig. 5, represents the manner of gearing the large and small toothed cylinders A and B, to each other, and the rate of movement of each; D, is a cog wheel on the arbor of the cylinder B, gearing into the small pinion C, on the shaft of the large cylinder A. It will therefore be perceived that very great power will be required to crush large substances between the teeth of these two cylinders. For this reason I have combined the teeth of the small cylinder B, with the stationary teeth of a concave (at the lower end of the plate G) as well as with the teeth of the large cylinder A; for the purpose of performing the first operation of cracking and crushing substances between the teeth of the small cylinder and the teeth of the concave combined therewith, and still repeating the same operations as in the Beal and Hale machine;—thus saving a large amount of power and greatly increasing the efficiency of the machine, without increasing its size, or adding materially to its cost. The substances after being broken between the teeth of the small cylinder (B,) and their coöperating stationary teeth,—as above set forth—fall on to the large cylinder (A,) and are a second time operated upon by its teeth as they pass between the teeth of the small cylinder (B) ; and the substances are a third time operated upon between the teeth of the large cylinder (A,) and the teeth of the adjustable concave (F,) previous to their discharge through the spout. Substances that do not require to be ground finely, will be sufficiently operated upon by the teeth of the small cylinder acting in conjunction with their coöperating stationary teeth projecting from the plate G, and with the teeth of the large cylinder, without the aid of the adjustable concave F, below the large cylinder.

Fig. 2, is a vertical section of a modification of my improved mill, in which the small cylinder (E,) has curved teeth coöperating with stationary teeth projecting from the plate K, secured to the side of the hopper. I shall vary the size and shape of the teeth in the small cylinders (B or E,) and also those coöperating therewith upon the plates G or K, to suit the various substances to be operated upon.

Figs. 3 and 4, are perspective views of the plates G, and K, referred to above.

Having thus fully described my improvement to the machine for cracking, crushing, and grinding cobs, corn, &c., patented by Beal and Hale Decr. 17th 1846, what I claim as my invention and desire to secure by Letters Patent, is—

The combined and simultaneous action of the teeth of the small cylinder,—having a slow motion—with a series of stationary teeth, and with the teeth of the large cylinder,—running at a high speed,—substantially in the manner and for the purpose herein set forth.

WILLIAM BEAL, JR.

Attest:
  EDWIN A. ALGER,
  CHAS J. ADAMS.